United States Patent
Raiser et al.

(10) Patent No.: US 7,830,236 B2
(45) Date of Patent: Nov. 9, 2010

(54) DC-DC CONVERTER FOR FUEL CELL APPLICATION USING HYBRID INDUCTOR CORE MATERIAL

(75) Inventors: Stephen Raiser, Wiesbaden (DE); John T. Hall, Woodland Hills, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 9 days.

(21) Appl. No.: 12/207,188

(22) Filed: Sep. 9, 2008

(65) Prior Publication Data

US 2010/0060404 A1  Mar. 11, 2010

(51) Int. Cl.
  *H01F 27/24* (2006.01)
  *H01F 27/28* (2006.01)
  *H01F 17/06* (2006.01)

(52) U.S. Cl. .............. 336/212; 336/178; 336/220

(58) Field of Classification Search .......... 336/212, 336/220, 178
  See application file for complete search history.

(56) References Cited

U.S. PATENT DOCUMENTS

| | | | |
|---|---|---|---|
| 3,426,305 A | 2/1969 | Keble | |
| 4,213,084 A * | 7/1980 | Hiromitsu | ............ 323/250 |
| 5,155,676 A * | 10/1992 | Spreen | ............ 363/126 |
| 5,747,981 A | 5/1998 | Callanan | |
| 6,323,626 B1 | 11/2001 | Raiser | |
| 6,668,444 B2 * | 12/2003 | Ngo et al. | ............ 29/606 |
| 7,034,648 B2 * | 4/2006 | Shirahata et al. | ............ 336/220 |
| 7,142,081 B1 * | 11/2006 | Shudarek | ............ 336/178 |
| 2008/0074230 A1 * | 3/2008 | Chen et al. | ............ 336/212 |
| 2009/0027151 A1 | 1/2009 | Nakatsu et al. | |
| 2009/0189728 A1 * | 7/2009 | Fukui et al. | ............ 336/221 |

FOREIGN PATENT DOCUMENTS

| | | |
|---|---|---|
| BE | 740191 A | 3/1970 |
| DE | 526175 C | 6/1931 |
| DE | 196 08 891 A1 | 9/1997 |
| JP | 61248507 A | 11/1986 |
| JP | 62049609 A | 3/1987 |
| JP | 62062510 A | 3/1987 |
| JP | 2001035726 A | 2/2001 |

* cited by examiner

*Primary Examiner*—Anh T Mai
(74) *Attorney, Agent, or Firm*—John A. Miller; Miller IP Group, PLC

(57) ABSTRACT

An inductor that includes end core pieces and a plurality of center block core pieces between the end core pieces that define a plurality of gaps. The end core pieces are made of an amorphous alloy to provide good magnetic field properties and the center core pieces are stamped magnetic sheets forming a laminate structure to provide ease of manufacturability. In one non-limiting embodiment, the end core pieces are an amorphous iron alloy and the center core pieces are stamped silicon-iron.

12 Claims, 3 Drawing Sheets

DC-DC CONVERTER FOR FUEL CELL APPLICATION USING HYBRID INDUCTOR CORE MATERIAL

BACKGROUND OF THE INVENTION

1. Field of the Invention

This invention relates generally to an inductor including multiple center core pieces providing multiple gaps and, more particularly, to an inductor including end core pieces and multiple center core pieces providing multiple gaps where the end core pieces are made of an amorphous alloy to provide good magnetic properties and the center core pieces are a stamped plate laminate structure to provide ease of manufacturability.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack.

Most fuel cell vehicles are hybrid vehicles that employ a supplemental power source or rechargeable electrical energy storage device (RESS) in addition to the fuel cell stack, such as a high voltage DC battery, a super-capacitor or an ultracapacitor. The RESS provides supplemental power for the various vehicle auxiliary loads, for system start-up and during high power demands when the fuel cell stack is unable to provide the desired power. The fuel cell stack provides power to an electric traction motor through a DC high voltage bus line for vehicle operation. The RESS provides supplemental power to the voltage bus line during those times when additional power is needed beyond what the stack can provide, such as during heavy acceleration. For example, the fuel cell stack may provide 70 kW of power. However, vehicle acceleration may require 100 kW of power. The fuel cell stack is used to recharge RESS at those times when the fuel cell stack is able to provide the system power demand. The generator power available from the traction motor during regenerative braking is also used to recharge the RESS.

In the hybrid vehicle discussed above, a boost DC/DC converter is sometimes employed to match the lower voltage fuel cell stack to the higher voltage RESS. DC/DC converters often employ a multi-phase array of inductors that provide the task of increasing the DC voltage. A typical inductor in the inductor array includes a magnetic core, such as an iron core, where a gap is provided between core pieces. Isolated metal windings are wrapped around the core as a coil and a current propagating through the windings generates a magnetic flux in the core and the gap. Suitable switching is provided to switch the voltage applied to the windings so that the magnetic flux change increases the voltage potential at the output of the converter.

There has been an effort in the industry to reduce the size, weight and cost of DC/DC converters in fuel cell systems for vehicles, and increase their reliability and efficiency.

SUMMARY OF THE INVENTION

In accordance with the teachings of the present invention, an inductor is disclosed that includes end core pieces and a plurality of center block core pieces between the end core pieces that define a plurality of gaps. The end core pieces are made of, for example, an amorphous alloy to provide good magnetic properties and the center core pieces are, for example, stamped electrical steel sheets forming a laminate structure to provide ease of manufacturability. In one non-limiting embodiment, the end core pieces are an amorphous iron alloy and the center core pieces are stamped silicon-iron.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an inductor including end core pieces made of an amorphous alloy and center core pieces providing multiple gaps formed of stamped metal sheets is merely exemplary in nature, and is in no way intended to limit the invention or its applications or uses. For example, the inductor of the invention has particular application for an inductor in an inductor array for a DC/DC boost converter in a fuel cell system. However, as will be appreciated by those skilled in the art, the inductor of the invention may have application for other systems.

Figure 1:
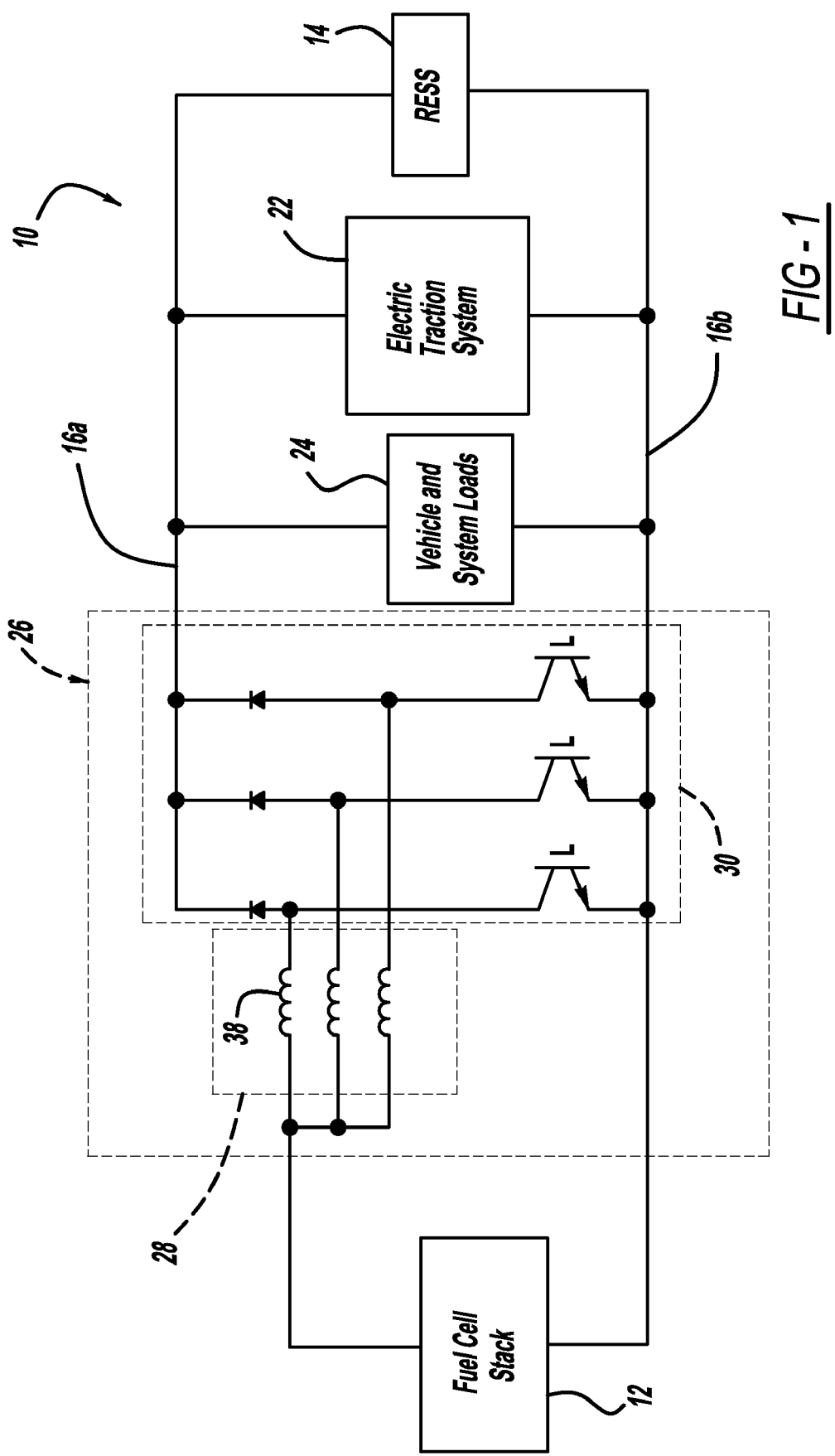
FIG. 1 is a schematic block diagram of a fuel cell system including a DC/DC converter having an inductor array, according to an embodiment of the present invention.

FIG. 1 is a schematic block diagram of a fuel cell system 10 including a system fuel cell stack 12 and a rechargeable electrical energy system (RESS) 14 both electrically coupled to high voltage bus lines 16a and 16b. The RESS 14 can be any suitable DC power source for the purposes described herein, such as a battery or an ultracapacitor (also referred to as a super-capacitor), etc. Various electrical components are electrically coupled to the high voltage bus lines 16a and 16b, such as an electric traction motor 22 that propels the vehicle, and other vehicle and system loads 24, such as a cathode side air compressor.

A simplified DC/DC converter 26 is provided to boost the fuel cell stack voltage to the higher voltage of the bus lines 16a and 16b. The DC/DC converter 26 includes an inductor array 28 and a controlled switching network 30, where the switching network 30 switches inductors 38 in the inductor array 28 from high voltage ground to high voltage output in order to boost the fuel cell stack voltage in a manner that is well understood to those skilled in the art. This conversion method is commonly known as boost conversion. Boost converters can be built using a single inductor or by using a plurality of time shifted switching inductors in parallel boost stages to smooth the switching ripple effects. The DC/DC converter 26 provides a 3-phase boost converter design for this purpose.

Figure 2:
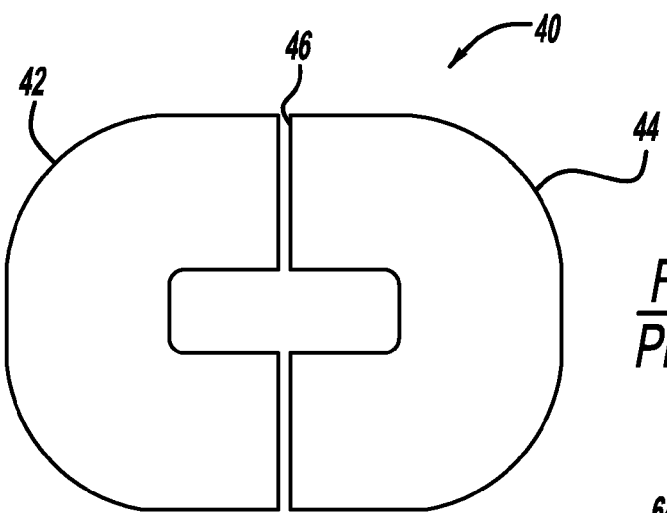
FIG. 2 is a cross-sectional view of an inductor core including U-shaped inductor pieces defining a gap therebetween.

FIG. 2 is a cross-sectional view of a core 40 of an inductor for a DC/DC converter of the type discussed above. The core 40 includes a first U-shaped core piece 42 and a second U-shaped core piece 44 spaced apart from each other to define a gap 46 therebetween. Conductor coils, discussed below, are wound around the legs of the U-shaped core pieces 42 and 44, and when current flows through the coils, a magnetic flux is created in the core 40 and the gap 46 that provides the energy for the voltage conversion. Traditional core pieces for inductors of this type are stamped sheets of a magnetic material, such as iron, that are laminated together to provide the desired core thickness.

Because the gap 46 defines the amount of magnetic energy that will be stored in the inductor, it is often desirable to make the gap 46 wide. However, as the width of the gap 46 increases, a fringing flux at the corners of the U-shaped pieces 42 and 44 increases where the magnetic field lines extend away from the core 40. The fringing flux creates eddy current losses in the core material and windings and adds an efficiency loss to the system.

Figure 3:
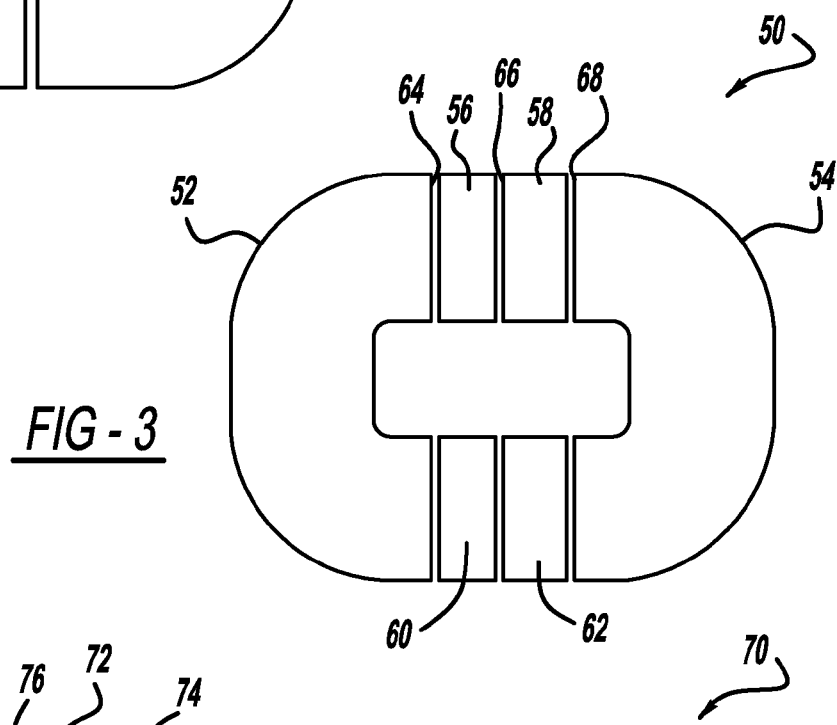
FIG. 3 is a cross-sectional view of an inductor core including center inductor pieces defining a plurality of gaps.

In order to overcome the drawback of fringing flux, and still provide significant gap space for high power applications, it is known in the art to provide more than one gap in an inductor core. FIG. 3 is a cross-sectional view of an inductor core 50 including U-shaped end pieces 52 and 54 and four center block pieces 56, 58, 60 and 62 positioned therebetween. The U-shaped pieces 52 and 54 and the center pieces 56, 58, 60 and 62 are spaced apart to define three narrow gaps 64, 66 and 68 at the center of the core 50, as shown. Therefore, the overall gap size can be increased to provide an increase in magnetic stored energy without the detrimental fringing flux that occurred as a result of wide gaps.

Traditional cores for inductors of this type are typically laminated pieces of iron or other ferromagnetic material that provide good magnetic field properties. In order to reduce the losses in the core material, it is known in the art to use an amorphous alloy material that has superior magnetic properties to regular iron. However, the amorphous alloy cannot economically be manufactured into as small of a size as the pieces 56, 58, 60 and 62 would need to be for a fuel cell system boost converter application using standard low cost manufacturing and segmenting cutting processes because of the materials brittleness.

Various amorphous alloys are known in the art for magnetic cores in an inductor. These amorphous alloys include alloys made from iron, nickel, cobalt, etc. The core material needs to be manufactured in a highly controlled manner to produce an amorphous structure, i.e., non-crystalline, that provides the desired magnetic properties. In one known technique, a molten alloy is cast through a nozzle onto a rotating cooled copper wheel, which causes a thin layer of the alloy to immediately solidify and peel off of the wheel in a thin endless ribbon. The solidification process is so fast that the alloy cannot form crystals. These ribbons have excellent magnetic properties, but because they are thin and have low electrical conductivity due to their amorphous structure, eddy current losses in the material is extremely small. Therefore, those materials can be used in high power density, high frequency applications where regular iron core laminates would overheat from the losses. The ribbons are wound on a mandrel with traces of glue in between to get a solid O-shaped core. The O-shaped core is typically cut in the middle to obtain the two U-shaped end pieces discussed herein.

The present invention proposes a hybrid core for the core 50 that includes both the amorphous alloy for the U-shaped pieces 52 and 54, and the traditional stamped metal sheet cores for the center pieces 56, 58, 60 and 62. Thus, the center pieces 56, 58, 60 and 62 are stamped pieces that have been laminated together by known manufacturing processes suitable for the size of the sections 56, 58, 60 and 62, and combined with the amorphous alloy pieces 52 and 54 that complete the magnetic flux path. Various materials are known in the art that are suitable for the core material of an inductor and are suitable for the known stamping processes of sheet materials that are formed together into laminates. For example, silicon-iron materials can be used, where the iron provides the desired magnetic properties and the silicon improves the performance, generally by reducing eddy current losses.

The losses of the core 50 are determined by the majority of the material, which will still be the amorphous metal, while the smaller gap forming pieces have relatively high specific losses, but in a very small volume so that they do not contribute significantly to the overall losses. The magnetic properties, especially saturation flux density, of amorphous iron and regular stamped sheet iron are sufficiently close so that the core performance is not limited by either of the materials. Combining the advantages of the amorphous metal with the advantages of the regular stamped sheet cores allows smaller power conversion inductors to be built with lower cost, size, weight and magnetic losses.

Figure 4:
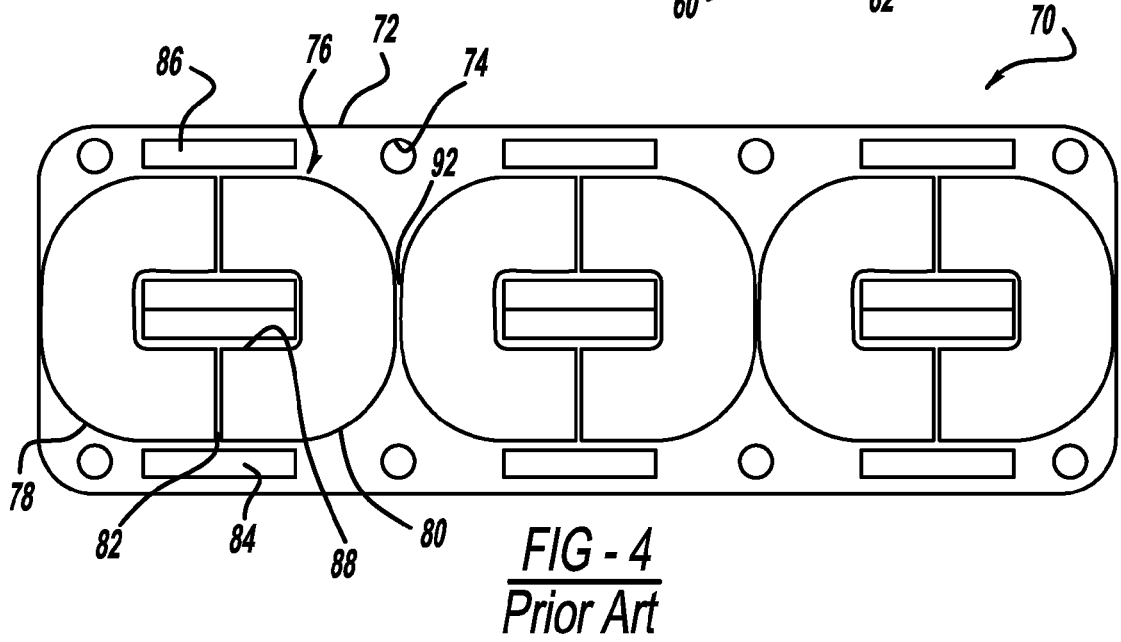
FIG. 4 is a cross-sectional view of an inductor array including three spaced apart inductors.

FIG. 4 is a cross-sectional view of an inductor array 70 suitable to be used as the inductor array 28 in the system 10 of the type that is known in the art. The inductor array 70 includes a housing structure 72 including mounting holes 74 for mounting the array 70 at a suitable location. The inductor array 70 has three closely spaced inductors 76 each including a magnetic core 40 having U-shaped end pieces 78 and 80 defining a gap 82 therebetween. Each inductor 76 includes two windings 84 and 86 that are wound around leg portions of the end pieces 78 and 80, as shown, and through a central opening 88 between the end pieces 78 and 80. The coils 84 and 86 would be electrically coupled together, either in series or in parallel. There are three of the inductors 76 in the array 70 to provide a smooth transition for the voltage conversion. Particularly, the inductors 76 are switched into and out of the circuit using the switching network 30 with a defined phase relationship so that the voltage conversion is a smooth transition for switching of the coils 84 and 86.

Figure 5:
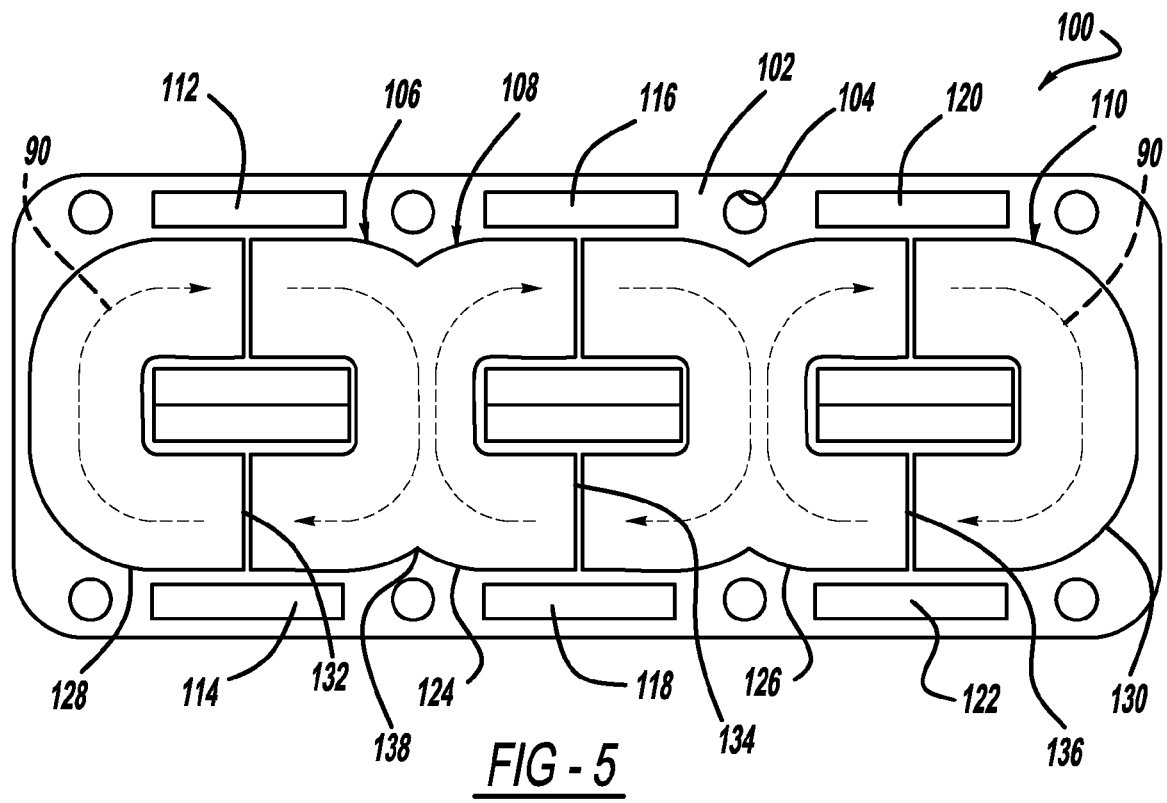
FIG. 5 is a cross-sectional view of an inductor array including three inductors sharing common core pieces and a flux path, according to an embodiment of the present invention.

FIG. 5 is a cross-sectional view of an inductor array 100 including a housing structure 102 and mounting holes 104, according to an embodiment of the present invention. The inductor array 100 includes three inductors 106, 108 and 110. Although three inductors are provided in the inductor array 100 for this design, this is merely by example as a compromise in complexity verses higher inductor phase count smoothing benefits. This part of the invention can be provided for an inductor array including inductors of two or more. The inductor 106 includes coils 112 and 114, the inductor 108 includes coils 116 and 118, and the inductor 110 includes coils 120 and 122. According to the invention, adjacent inductors 106, 108 or 110 include a shared core piece. Particularly, the inductors 106 and 108 share a core piece 124 and the inductors 108 and 110 share a core piece 126. The inductor 106 includes a U-shaped end core piece 128 opposite to the core piece 124 and the inductor 110 includes a U-shaped end piece 130 opposite to the core piece 126. A gap 132 is provided between the core pieces 124 and 128 for the inductor 106, a gap 134 is provided between the core pieces 124 and 126 for the inductor 108, and a gap 136 is provided between the core pieces 126 and 130 for the inductor 110.

As can be seen, magnetic flux lines 90 from the inductors 106 and 108 travel in opposite directions in the core piece 124, and magnetic flux lines 90 of the inductors 108 and 110 travel in opposite directions in the core piece 126. Thus, as the strength of the flux lines 90 increases and decreases in response to the switching phase relationship between the inductors, there is at least a partial cancellation of the flux lines 90 propagating in opposite directions in the common flux part segment.

Because the inductors 106 and 108 share a core piece and the inductors 108 and 110 share a core piece, the amount of core material used in the array 100 can be reduced over the amount of core material used in the array 70 for the same size inductor array. Therefore, the size and weight of the inductor array 100 can be reduced over the inductor array 70. For example, the length of the array 100 can be about 215 mm for one particular boost converter application, which is a 30% improvement over the length of the array 70. Further, by combining the core pieces as described herein, the electrical losses of the inductor array 100 can be reduced from the electrical losses of the inductor array 70.

The core pieces 124 and 126 have an indented portion 138 at their centers halfway between the gaps in the inductors, such as would be formed by two back-to-back U-shaped members. As the flux cancels at least partly, the common core pieces can even be made such that they are smaller in cross-section than would be required for an individual core piece. In an alternate embodiment, those indented portions could be significantly smaller to further reduce the size of the core pieces 124 and 126, and thus the cost and weight of the array 100.

Figure 6:
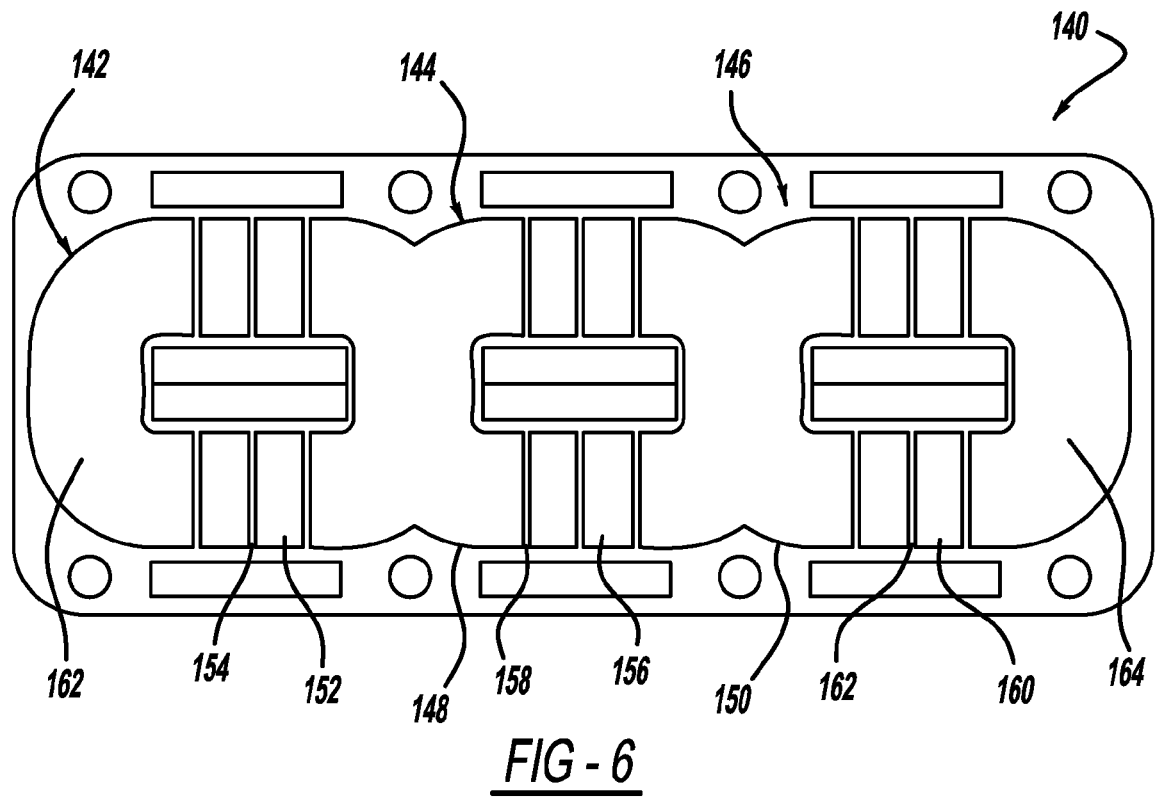
FIG. 6 is a cross-sectional view of an inductor array including three inductors having shared core pieces and flux path and including multiple center core pieces defining multiple core gaps, according to another embodiment of the present invention.

FIG. 6 is a cross-sectional view of an inductor array 140 that incorporates the advantages of the design of the core 50 shown in FIG. 3 and the design of the cores in the inductor array 100 shown in FIG. 5, according to another embodiment of the present invention. Particularly, the inductor array 140 includes three inductors 142, 144 and 146. The inductors 142 and 144 share a core piece 148 similar to the core piece 124, and the inductors 144 and 146 share a core piece 150 similar to the core piece 126. The inductor 142 includes end core piece 162 and the inductor 146 includes end core piece 164. Further, the inductor 142 includes center core pieces 152 that define three gaps 154, the inductor 144 includes center core pieces 156 that define three gaps 158 and the inductor 146 includes center core pieces 160 that define three gaps 162. As above, the core pieces 148 and 150 can be an amorphous alloy and the center core pieces 152, 156 and 160 can be stamped metal core pieces that form a laminate and allow for ease of manufacturability.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An inductor array comprising a plurality of inductors, each of the inductors in the inductor array including a plurality of core pieces including opposing end core pieces that are spaced apart from each other, wherein adjacent inductors share a single core piece and a common flux path, said plurality of core pieces further including a plurality of center block core pieces defining a plurality of gaps at the center of each inductor, wherein the end core pieces are made of an amorphous alloy and the center block core pieces and single core pieces are stamped metal sheets formed as a laminate.

2. The inductor array according to claim 1 wherein the shared core pieces are configured as back-to-back U-shaped core pieces with an indented center region.

3. The inductor array according to claim 1 wherein the amorphous alloy is an iron alloy.

4. The inductor according to claim 1 wherein the opposing end core pieces are U-shaped end core pieces defining a central opening through which coils are wound.

5. The inductor array according to claim 1 wherein the stamped metal center core pieces and single core pieces are stamped silicon-iron core pieces.

6. The inductor array according to claim 1 wherein the plurality of inductors includes three inductors.

7. The inductor array according to claim 1 wherein the inductor array is part of a DC/DC boost converter.

8. The inductor array according to claim 7 wherein the DC/DC boost converter is part of a fuel cell system and is electrically coupled to a fuel cell stack.

9. An inductor array for a DC/DC boost converter, said inductor array including three inductors where each of the inductors includes a plurality of core pieces including opposing end core pieces that are spaced apart from each other, wherein adjacent inductors share a single core piece and a common flux path, said shared single core pieces being configured as back-to-back U-shaped core pieces with an indented center region, said plurality of core pieces further including a plurality of center block pieces, wherein the plurality of center block pieces are substantially parallel and positioned to form a plurality of gaps at the center of each inductor, wherein the end core pieces are made of an amorphous alloy and the center block core pieces and shared single core pieces are stamped metal sheets.

10. The inductor array according to claim 9 wherein the amorphous alloy is an iron alloy.

11. The inductor array according to claim 9 wherein the stamped metal center core pieces and shared single core pieces are stamped silicon-iron core pieces.

12. The inductor array according to claim 9 wherein the DC/DC boost converter is part of a fuel cell system and is electrically coupled to a fuel cell stack.

* * * * *